United States Patent
Mohammed et al.

(10) Patent No.: US 9,825,569 B2
(45) Date of Patent: Nov. 21, 2017

(54) METHOD FOR REDUCING PERFORMANCE DEGRADATION DUE TO REDUNDANT CALCULATION IN HIGH INTEGRITY APPLICATIONS

(71) Applicant: Infineon Technologies AG, Neubiberg (DE)

(72) Inventors: Hamzath Mohammed, Bangalore (IN); Rafael Zalman, Markt Schwaben (DE); Tejaswini Basavarajaiah, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 656 days.

(21) Appl. No.: 14/272,567

(22) Filed: May 8, 2014

(65) Prior Publication Data

US 2015/0326155 A1    Nov. 12, 2015

(51) Int. Cl.
| | | |
|---|---|---|
| H02P 6/06 | (2006.01) |
| H02P 21/06 | (2016.01) |
| H02P 6/12 | (2006.01) |
| H02P 21/00 | (2016.01) |

(52) U.S. Cl.
CPC ............ *H02P 21/06* (2013.01); *H02P 6/12* (2013.01); *H02P 21/0025* (2013.01)

(58) Field of Classification Search
CPC ..................................................... H02P 6/12
USPC ..................................... 318/400.03
See application file for complete search history.

(56) References Cited

U.S. PATENT DOCUMENTS

| | | | | |
|---|---|---|---|---|
| 6,308,140 B1 * | 10/2001 | Dowling | ............... | G01R 31/343 324/765.01 |
| 8,816,616 B2 * | 8/2014 | Costanzo | ............ | H02P 29/0038 318/400.02 |
| 2003/0042790 A1 * | 3/2003 | Amberkar | ............... | B60T 8/172 303/140 |
| 2004/0176879 A1 * | 9/2004 | Menon | ...................... | F02C 9/00 701/1 |
| 2004/0176901 A1 * | 9/2004 | Uluyol | ...................... | F02C 9/00 701/100 |

(Continued)

OTHER PUBLICATIONS

Zambada, et al. "Sensorless Field Oriented Control of a PMSM." Microchip Technology Inc. Published in 2010.

*Primary Examiner* — Bentsu Ro
*Assistant Examiner* — Gabriel Agared
(74) *Attorney, Agent, or Firm* — Eschweiler & Potashnik, LLC

(57) ABSTRACT

The present disclosure relates to a method of advanced motor control that reduces the resource demands (e.g., run-time) used to meet safety requirements by running a reduced portion of feedback control loop processes twice. In some embodiments, the method performs a plurality of processes within a feedback control loop of a motor control process configured to control operation of a motor. Performance of a first portion of the plurality of processes, which is less than the plurality of processes, is repeated within the feedback control loop. Performance of a second portion of the plurality of processes is not repeated within the feedback control loop. By repeating performance of first portion of the plurality of processes that is less than the plurality of processes, the method is able to improve performance of a motor by reducing run-time of the motor control process.

20 Claims, 7 Drawing Sheets

(56) References Cited

U.S. PATENT DOCUMENTS

2005/0049770 A1* 3/2005 Liu .................. B62D 5/0487
701/40
2010/0072932 A1* 3/2010 Seger .................. H02P 6/14
318/490
2012/0065745 A1* 3/2012 Suel, II .............. D06F 33/02
700/40
2013/0103972 A1* 4/2013 Ozer ................ G06F 11/0727
714/2

* cited by examiner

METHOD FOR REDUCING PERFORMANCE DEGRADATION DUE TO REDUNDANT CALCULATION IN HIGH INTEGRITY APPLICATIONS

BACKGROUND

Over the past few years, advances in computer systems have allowed for advanced motor control techniques to execute complex motor control algorithms. Such advanced motor control techniques can provide motors with a number of advantages including improved performance and lower energy consumption. For example, advanced motor control techniques are often used in brushless DC (BLDC) motors to provide significant advantages over brushed DC motors including increased efficiency, reduced maintenance, etc.

Field-oriented control (FOC) is a popular advanced motor control technique that controls three-phase AC electric motors by means of two controllable variable frequency output variables. FOC was originally developed for high-performance motor applications, but more recently has become an attractive option for lower performance applications as well due to the ability of FOC to reduce motor cost and power consumption.

DETAILED DESCRIPTION

Figure 1:
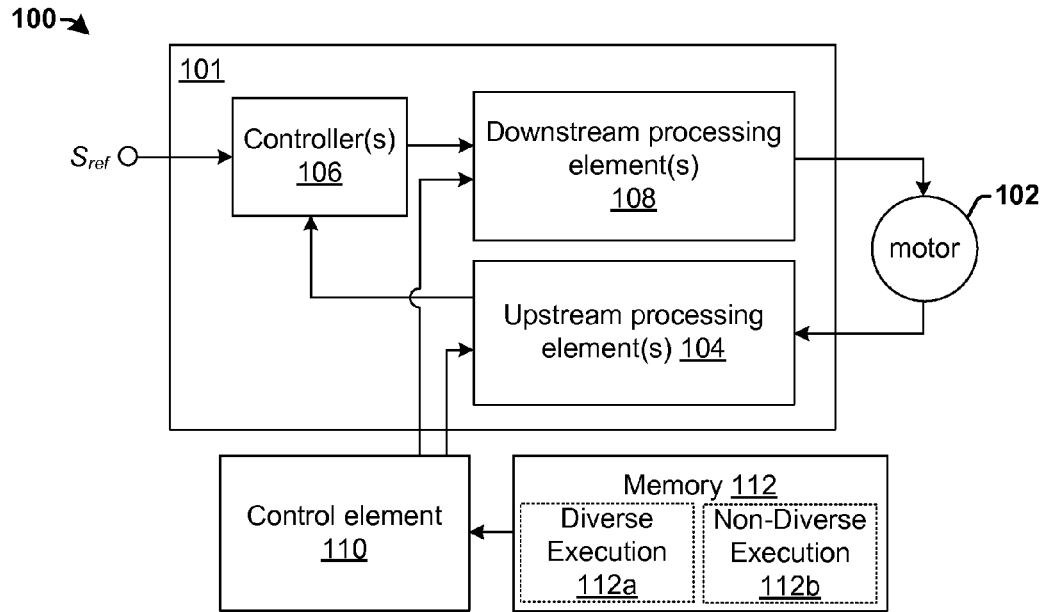
FIG. 1 is a block diagram of some embodiments of an advanced motor control system having a feedback control loop configured to adjust operation of a motor.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

When used in safety critical applications, advanced motor control techniques must be able to meet strict performance requirements. For example, advanced motor control techniques used in automobiles must be able to meet requirements set forth in Automotive Software Integrity Level (ASIL) standards. To meet ASIL standards, conventional field-oriented control (FOC) processes are executed twice to detect and verify errors (e.g., transient faults). In multi-core micro-controllers, FOC processes can be performed in parallel on separate cores (e.g., on a main core and on a checker core) to limit the run-time of an FOC loop. However, such multi-core micro-controllers are relatively expensive and have a high power consumption that may be undesirable.

In single core micro-controllers, errors can be detected by operating a single core to perform FOC processes twice and in diverse ways. For example, a single core micro-controller may perform FOC processes during a first time period using a first method (e.g., a floating point calculation) and during a subsequently second time period using a second method (e.g., a fixed point calculation). However, performing FOC processes twice increases the run time of an FOC loop. Since an FOC loop is repeatedly run over short periods of time (e.g., approximately 50 microseconds), such an increase in run-time will negatively impact performance of a motor.

Accordingly, the present disclosure relates to a method of advanced motor control that reduces the resource demands (e.g., run-time) used to meet safety requirements by running a reduced portion of feedback control loop processes twice. In some embodiments, the method comprises performing a plurality of processes within a feedback control loop of a motor control process configured to control operation of a motor. Performance of a first portion of the plurality of processes, which is less than the plurality of processes, is repeated within the feedback control loop. Performance of a second portion of the plurality of processes is not repeated within the feedback control loop. By repeating performance of first portion of the plurality of processes that is less than the plurality of processes, the method is able to improve performance of a motor by reducing run-time of the motor control process.

FIG. 1 is a block diagram of some embodiments of an advanced motor control system 100 having a feedback control loop 101 configured to adjust operation of a motor 102.

The advanced motor control system 100 comprises a motor 102 connected to a feedback control loop 101, which repeatedly executes a motor control algorithm/process that controls operation of the motor 102 over a plurality of iterations. The feedback control loop 101 is configured to receive data from the motor 102 that is indicative of the motor's performance, and based upon that data to make adjustments to one or more performance parameters of the motor 102, such as torque, speed, acceleration, etc. For example, the feedback control loop 101 may be configured to measure the instantaneous acceleration of a load of the motor 102, and to use the instantaneous acceleration to adjust a torque being applied by the motor 102.

The feedback control loop 101 comprises a plurality of processing elements, respectively configured to perform a process (e.g., a transformation, a modulation, a manipulation, etc.) on data received from the motor 102. In some embodiments, the plurality of processing elements comprise one or more upstream processing elements 104 and one or more downstream processing elements. The one or more upstream processing elements 104 are located within the feedback control loop 101 at a first position between the motor 102 and one or more controllers 106. The one or more downstream processing elements 108 are located within the feedback control loop 101 at a second position between the one or more controllers 106 and the motor 102.

The one or more upstream processing elements 104 are configured to receive the data from the motor 102, to process the received data, and to generate one or more first outputs. The one or more controllers 106 (e.g., PID controllers and/or PI controllers) are configured to generate one or more second outputs based upon a difference between a reference signal $S_{ref}$ and the one or more first outputs of the one or more upstream processing elements 104. The one or more second outputs are provided from the one or more controllers 106 to the one or more downstream processing elements 108. The one or more downstream processing elements 108 are configured to further process the one or more second outputs before providing one or more processed second outputs back to the motor 102.

A control element 110 is configured to selectively operate one or more of the plurality of processing elements, 104 and 108, within an iteration of the feedback control loop 101. In some embodiments, the control element 110 may be configured to operate the plurality of processing elements, 104 and 108, during a first iteration of the feedback control loop 101, and to operate a subset of the plurality of processing elements, 104 and 108, during a consecutive second iteration of the feedback control loop 101. In other words, the control element 110 selectively exempts some of the plurality of processing elements, 104 and 108, from being executing twice (i.e., so that not all processing elements in the feedback control loop 101 are run twice). By excepting some of the plurality of processing elements, 104 and 108, from being executed twice performance of the motor 102 can be improved by reducing run-time of the motor control process performed by feedback control loop 101.

In some embodiments, the control element 110 may selectively operate one of the upstream processing elements 104 without operating another one of the downstream processing elements 108 during a consecutive control loop. This is because errors in the downstream processing elements 108 will have a smaller impact on the motor 102 than errors in the upstream processing elements 104. For example, the feedback control loop 101 will recover from errors in processing elements downstream of the one or more controllers 106 within a relatively short time (e.g., one cycle), while the feedback control loop 101 will take a longer time to recover from errors in processing elements up to the one or more controllers 106.

In some embodiments, the control element 110 may be in communication with a memory element 112 configured to store data 112a that identifies which of the plurality of processing elements, 104 and 108, are to receive diverse execution (i.e., are to be executed twice and in diverse ways) and to store data 112b that identifies which of the plurality of processing elements, 104 and 108, are not to receive diverse execution. In various embodiments, the memory element 112 may comprise an electronic memory such as a flash memory, a RAM memory, etc.

Figure 2:
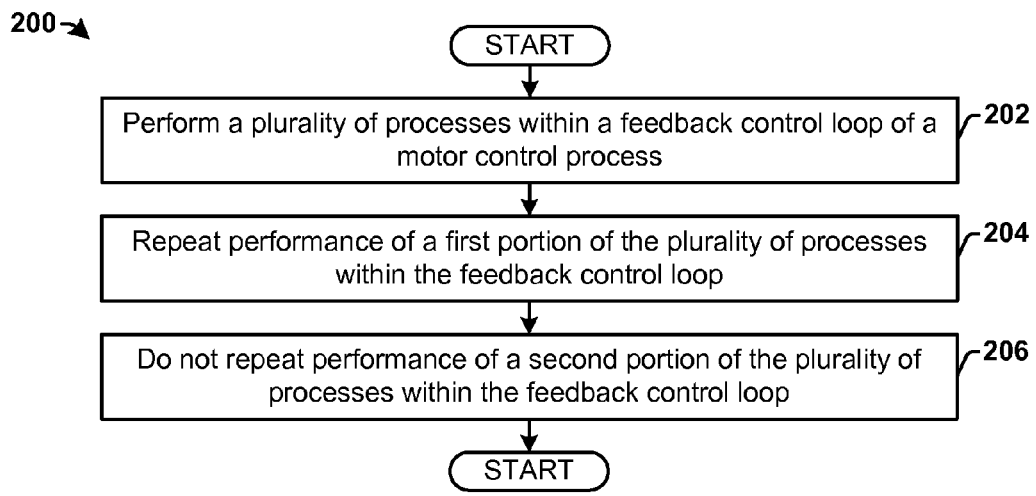
FIG. 2 is a flow diagram of some embodiments of a method of advanced motor control.

FIG. 2 is a flow diagram of some embodiments of a method 200 of advanced motor control.

At 202, a plurality of processes are performed within a feedback control loop of a motor control process configured to control operation of a motor. In various embodiments, the plurality of processes may comprise a transformation or a manipulation (e.g., forming an error vector) of data received from a motor, for example.

At 204, performance of a first portion of the plurality of processes within the feedback control loop is repeated. The first portion of the plurality of processes is less than the plurality of processes, so that performance of the all of the plurality of processes is not repeated. For example, in some embodiments, performance is repeated on processes performed up to the generation of an error signal by a controller.

At 206, performance of a second portion of the plurality of processes within the feedback control loop is not repeated. For example, in some embodiments, performance is not repeated on processes performed downstream of the generation of an error signal by a controller.

Figure 3:
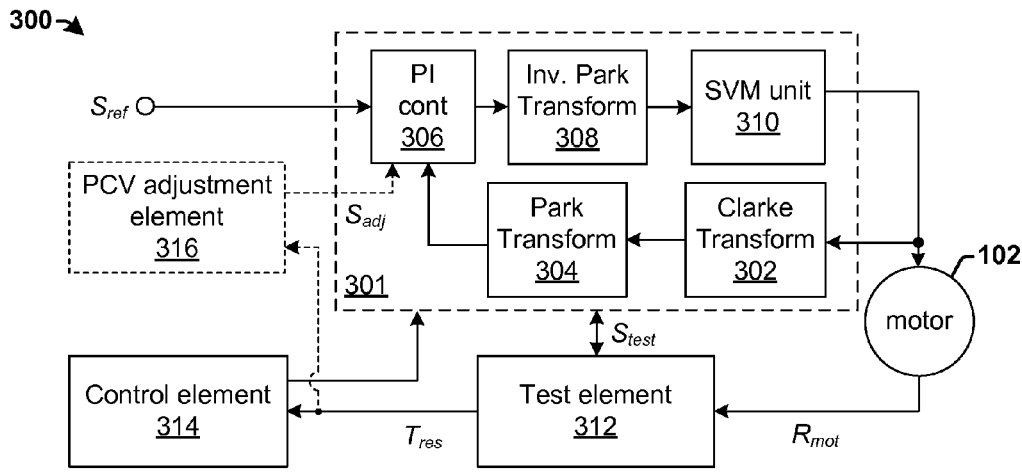
FIG. 3 is a block diagram of some embodiments of an advanced motor control system having a feedback control loop configured to implement a field-oriented control (FOC) process.

FIG. 3 is a block diagram of some embodiments of an advanced motor control system 300 configured to implement a field-oriented control (FOC) process.

The advanced motor control system 300 comprises an FOC feedback control loop 301 configured to execute a FOC algorithm/process to control operation of a motor 102. The FOC feedback control loop 301 comprises a Clarke transformation element 302 and a Park transformation element 304 located upstream of one or more PI controllers 306. The Clarke transformation element 302 is configured to perform a first coordinate transformation to transform input currents of the motor 102 to first output variables representing a first two-axis system. The Park transformation element 304 is configured to receive the first output variables and to perform a second coordinate transformation to transform the first output variables to second output variables representing a second two-axis system that is rotating with a rotor of the motor 102. The one or more PI controllers 306 are configured to receive the second output variables, and based thereupon to generate error signals that adjust performance parameters of the motor 102.

The FOC feedback control loop 301 further comprises an inverse Park transformation element 308 and an SVM (Space vector modulation) unit 310 located downstream of the one or more PI controllers 306. The inverse Park transformation element 308 is configured to rotate the error signals to a stationary reference frame. The SVM unit 310 is configured to control pulse width modulation of the input currents of the motor 102 based upon rotated error signals output from the inverse Park transformation element 308.

In some embodiments, the advanced motor control system 300 comprises a test element 312 configured to introduce a plurality of test sets $S_{test}$ (i.e., test vectors) into outputs of different processing elements (e.g., 302-310) of the FOC feedback control loop 301 and to measure a response $R_{mot}$ of the motor 102 to the plurality of test sets $S_{test}$. In some embodiments, the test sets $S_{test}$ are configured to introduce errors corresponding to transient faults into the outputs of the different processing elements. By introducing errors corresponding to transient faults into different positions of the FOC feedback control loop 301, the test element 312 can determine which processing elements (e.g., 302-310) of the FOC feedback control loop 301 are affected by transient faults, and therefore which of the processing elements should undergo diverse execution (i.e., be performed twice and in diverse ways).

For example, the test element 312 may introduce a first test set into an output of the Clarke transformation element 302 and measure a corresponding first speed response of the motor 102. The first speed response of the motor 102 indicates that the introduction of a transient fault into the output of the Clarke transformation element 302 significantly affects the speed response of the motor 102, and therefore that the Clarke transformation element 302 should undergo diverse execution. The test element 312 may also introduce the first test set into an output of the inverse Park transformation element 308 and measure a corresponding second speed response of the motor 102. The second speed response of the motor 102 indicates that the introduction of a transient fault into the output of the inverse Park transformation element 308 does not significantly affect the speed response of the motor 102 and therefore that the inverse Park transformation element 308 should not undergo diverse execution.

The test element 312 is configured to provide test results $T_{res}$ to a control element 314. Based upon the test results $T_{res}$, the control element 314 will selectively operate one or more processing elements (e.g., 302-310) of the FOC feedback control loop 301 during a given iteration of the FOC feedback control loop 301. In some embodiments, the control element 314 is configured to operate the one or more processing elements in a manner that performs diverse execution of the Clarke transformation element 302, the Park transformation element 304, and the one or more PI controllers 306, and that does not perform diverse execution of the inverse Park transformation element 308 and the SVM unit 310.

In some embodiments, the test element 312 may be further configured to provide test results to a PCV adjustment element 316 configured to selectively generate an adjustment signal $S_{adj}$ that adjusts one or more process control variables (e.g., a proportional gain (Kp) and/or an integral gain (Ki)) of the one or more PI controllers 306. By adjusting the one or more process control variables of the one or more PI controllers 306, the PCV adjustment element 316 can reduce the impact of an error caused by a transient fault.

Figure 4:
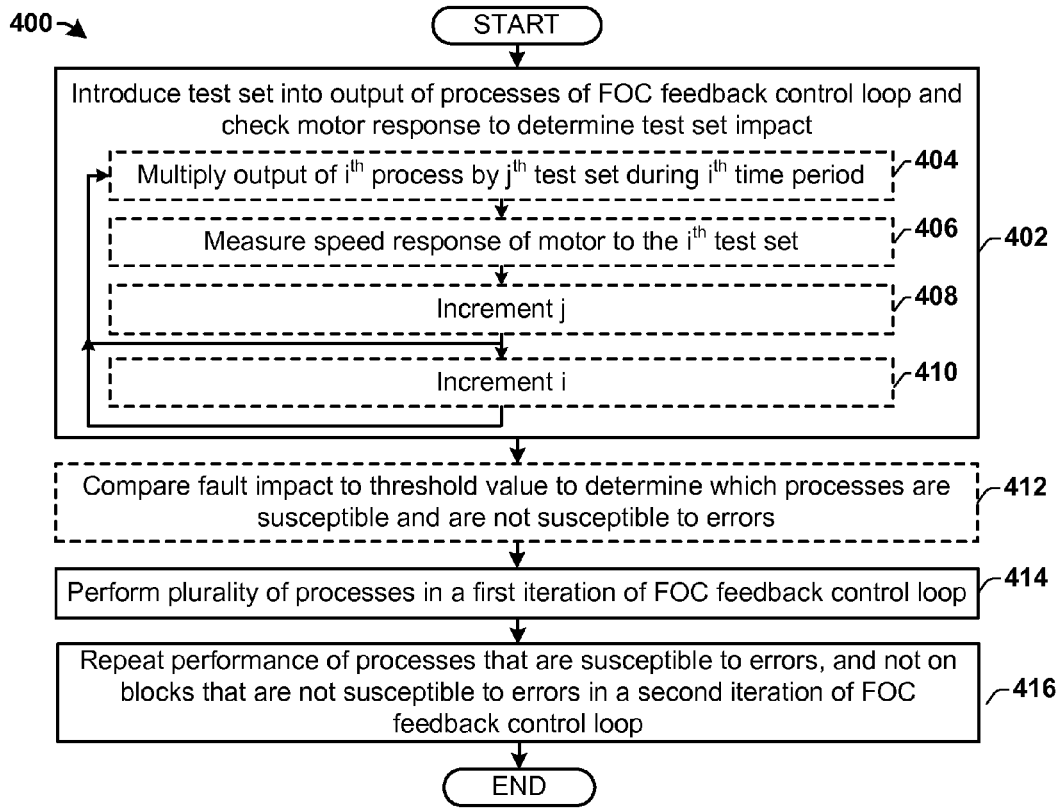
FIG. 4 is a flow diagram of some embodiments of a method of testing a FOC control loop to determine FOC processes that are to receive diverse execution and that are not to receive diverse execution.

FIG. 4 is a flow diagram of a method 400 of testing a FOC feedback control loop to determine FOC processes that are to receive diverse execution and that are not to receive diverse execution.

It will be appreciated that while the disclosed methods (e.g., methods 200 and 400) are illustrated and described below as a series of acts or events, the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

At 402, one or more test sets (i.e., test vectors) are introduced into outputs of one or more processes of a field-oriented control (FOC) feedback control loop of a motor control process and a response of a motor is measured to determine an impact of the one or more test sets. The test sets are configured to introduce errors (e.g., corresponding to transient faults) into the outputs of the one or more processes. In various embodiments, the plurality of processes may comprise a Clark transformation process, a Park transformation process, one or more PI controllers, an inverse Park transformation process, and a space vector modulation (SVM) process.

In some embodiments, the one or more test sets may be introduced and a motor response measured according to acts 404-410.

At 404, the output of an $i^{th}$ process (i.e., a Clark transformation, a Parke transformation, etc.) of a FOC feedback control loop is multiplied by a $j^{th}$ test set during an $i^{th}$ time period.

At 406, a response of the motor is measured to determine an impact of the $i^{th}$ test set. For example, a speed response of a motor (e.g., a drop in the motor's RPMs over time) may be measured in response to the introduction of the $i^{th}$ test set.

At 408, the method 400 proceeds to increment a value of j, so that a different test set is introduced into an output of a process of the FOC feedback control loop. In various embodiments, any number of test set may be used (i.e., j may be any range of numbers). In some embodiments, six test sets (i.e., j=1-6) configured to cover a large range of potential transient faults may be used to test the response of the FOC feedback control loop.

For example, a first test set (i.e., j=1) may be configured to multiply an output of a process (i.e., i=1-5) of the FOC feedback control loop by 10e30 to achieve transient faults comprising higher bit flips. A second test set (i.e., j=2) may be configured to multiply an output of the process (i.e., i=1-5) by 10e-30 to achieve transient faults comprising lower bit flips. A third test set (i.e., j=3) may be configured to multiply an output of the process (i.e., i=1-5) by −1 to achieve transient faults comprising a sign bit flip. A fourth test set (i.e., j=4) may be configured to multiply an output of the process (i.e., i=1-5) by 0.1 to achieve transient faults comprising a lower bit flip. A fifth test set (i.e., j=5) may be configured to multiply an output of the process (i.e., i=1-5) by 10e4 to achieve transient faults comprising a high error. A sixth test set (i.e., j=6) may be configured to multiply an output of the process (i.e., i=1-5) by −10e4 to achieve transient faults comprising a negative high error.

At 410, the method 400 proceeds to increment a value of i, so that the test sets (e.g., j=1-6) are introduced into an output of another process of the FOC feedback control loop.

At 412, the measured impact of the test sets is compared to one or more threshold values to determine which processes of the FOC feedback control loop are susceptible to errors (e.g., transient faults), and which processes are not susceptible to errors (e.g., transient faults). For example, in some embodiments, if a speed response of a motor to a test set introduced into the output of a Clarke transformation process violates a threshold, the Clarke transformation process is determined to be susceptible to transient faults. If the speed response of a motor to a test set introduced into the output of an inverse Park transformation process does not violate a threshold, the inverse Park transformation process is determined not to be susceptible to transient faults.

At 414, the plurality of processes of the FOC feedback control loop are performed within a first iteration of the FOC feedback control loop.

At 416, processes that are susceptible to errors are performed a second consecutive iteration of a FOC feedback control loop, and processes that are not susceptible to transient faults are not performed the second iteration. In some embodiments, the Clark transformation, the Park transformation, and the error generation by a PI controller may be performed a second time, while the inverse Park transformation, and the space vector modulation (SVM) to control a pulse with modulation (PWM) may be not performed a second time.

FIGS. 5A-5G are graphs showing a speed response of a motor controlled by an FOC feedback control loop in response to the introduction of various transient faults. FIGS. 5A-5G illustrate a speed of the motor in rotations per minute (RPM) on the y-axis and time on the x-axis. It will be appreciated that the output behavior is substantially the same for faults introduced up to a PI controller (i.e., faults introduced into the output signals of a Clarke transformation process, a Park transformation process, and the PI controllers). Similarly, the output behavior is substantially the same for faults introduced after the PI controller (i.e., faults introduced into the output signals of an Inverse Park transformation process and a SVM process).

Figure 5A:
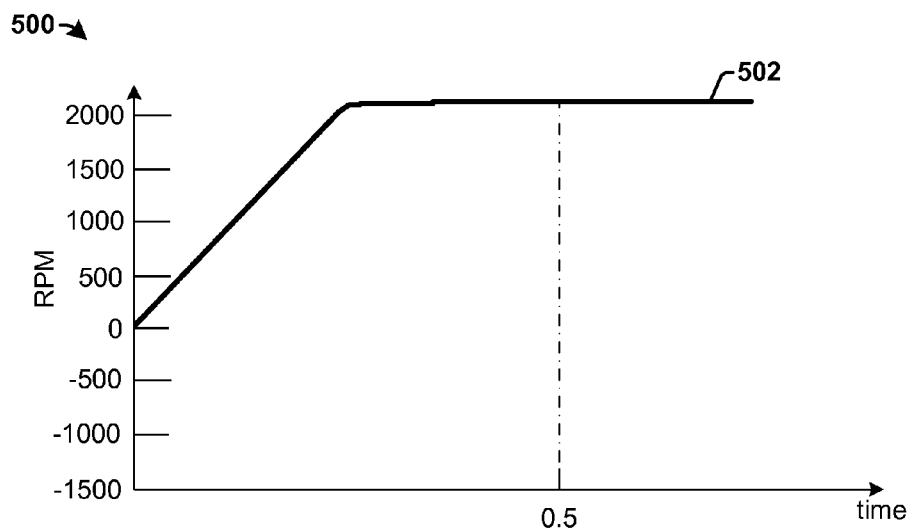
FIGS. 5A-5G are some exemplary diagrams showing the speed response of a motor in response to various types of transient faults.

FIG. 5A is a graph 500 illustrating a speed response 502 of a motor controlled by an FOC feedback control loop that is not subjected to any transient faults.

As shown in graph 500, since no transient fault is introduced into the FOC feedback control loop the speed response 502 of the motor shows a smooth, continuous increase in RPMs to a desired value.

Figure 5B:
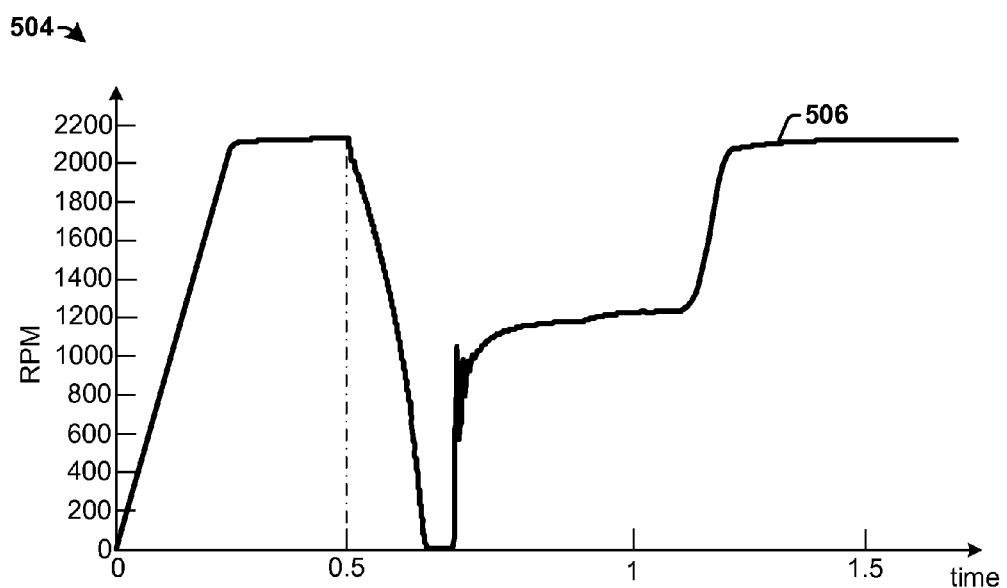

FIG. 5B is a graph 504 illustrating a speed response 506 of a motor to a first test case, which multiplies an output of a process located up to a PI controller by 10e30 to represent a transient fault comprising a high bit flip.

As shown in graph 504, at a time of 0.5 seconds a transient fault is injected at the output signal of a process located up to a PI controller of an FOC feedback control loop. The transient fault causes the speed response 506 of the motor to have a rotational velocity that decreases by a value of approximately 2,000 RPM. The reduction in the rotational velocity may take more than 0.5 seconds to recover, depending on the amount of error caused. If the PST (process safety time) is fixed around 10 ms, such a large reduction in the rotation velocity will be detrimental to operation of the motor and therefore is not acceptable. Accordingly, graph 504 shows that in response to the first test case diverse execution of processes located up to a PI controller should be performed in the FOC feedback control loop.

Figure 5C:
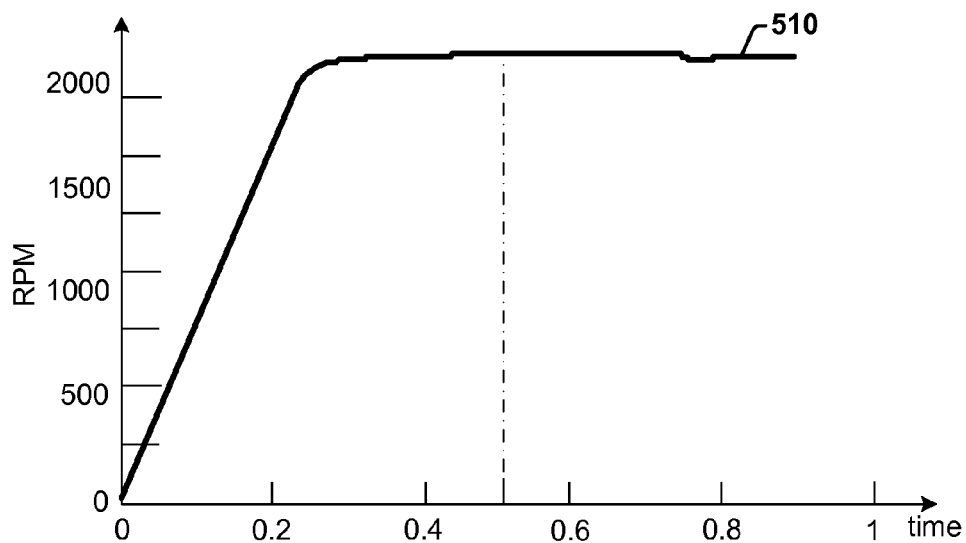

FIG. 5C is a graph 508 illustrating the speed response 510 of a motor to the first test case, which multiplies an output of a process located downstream of a PI controller by 10e30 to represent a transient fault comprising a high bit flip.

As shown in graph 508, at time of 0.5 seconds a transient fault is injected into the output signal of a process after the PI controller of an FOC feedback control loop. The transient fault causes substantially no disruption of the rotational velocity of the motor. Accordingly, graph 508 shows that in response to the first test case diverse execution of processes located downstream of a PI controller does not have to be performed in the FOC feedback control loop.

Figure 5D:
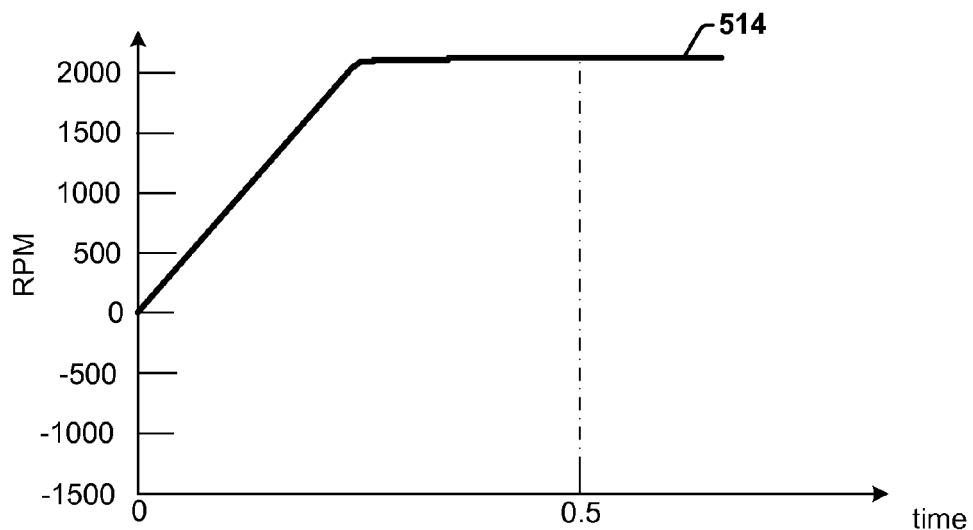

FIG. 5D is a graph 512 illustrating the speed response 514 of a motor to a second test case, which multiplies an output of a process located up to a PI controller by 0.1 to represent a transient fault comprising a low bit flip (e.g., a mantissa bit flip).

As shown in graph 512, at time of 0.5 seconds a transient fault is injected at the output signal of a process after the PI controller of an FOC feedback control loop. The transient fault causes substantially no reduction in the rotational velocity of the motor. Accordingly, graph 512 shows that in response to the second test case diverse execution of processes located downstream of the PI controller does not have to be performed in the FOC feedback control loop.

Figure 5E:
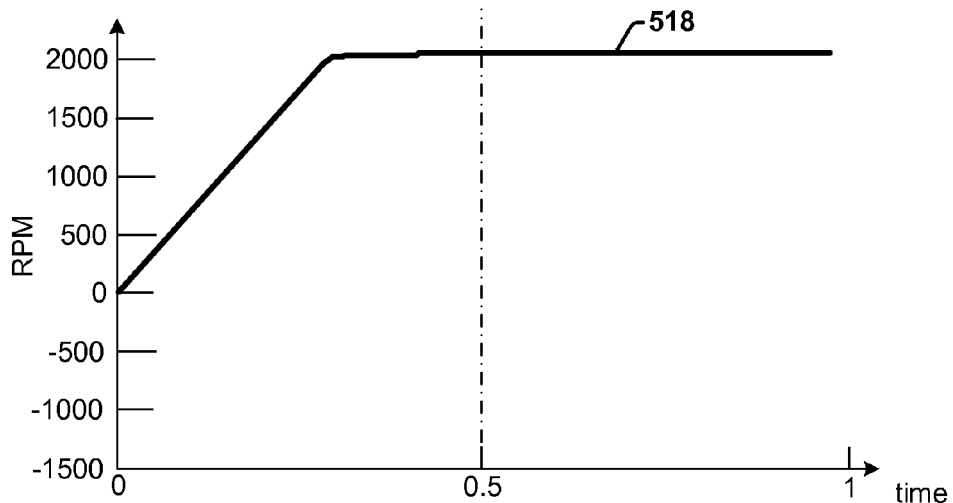

FIG. 5E is a graph 516 illustrating the speed response 518 of a motor to the second test case, which multiplies an output of a process located downstream of a PI controller by 0.1 to represent a transient fault comprising a low bit flip.

As shown in graph 516, at time of 0.5 seconds a transient fault is injected at the output signal of a process after the PI controller of an FOC feedback control loop. The transient fault causes substantially no reduction in the rotational velocity. Accordingly, graph 516 shows that in response to the second test case diverse execution of processes located downstream of the PI controller does not have to be performed in the FOC feedback control loop.

Figure 5F:
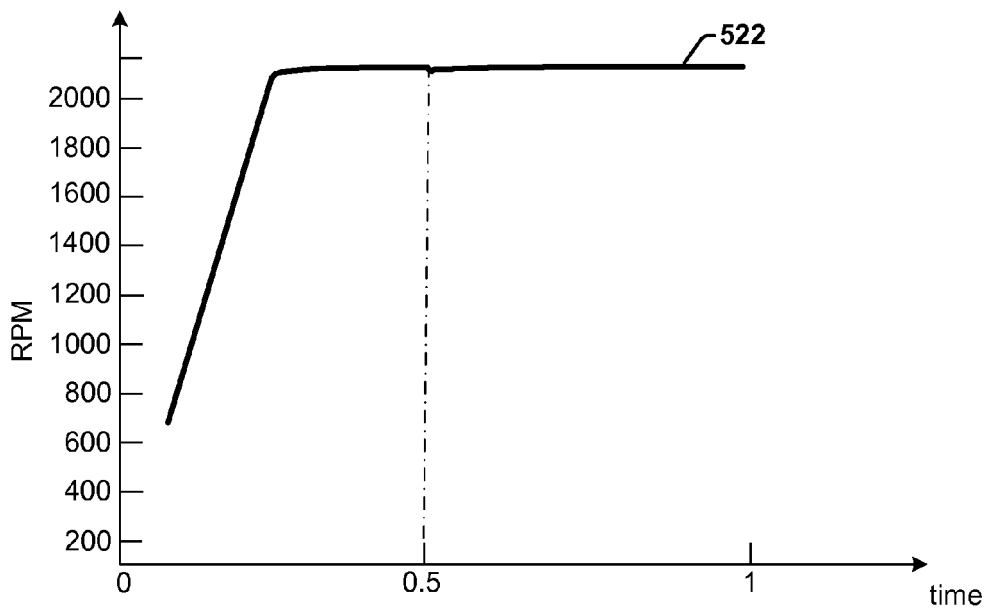

FIG. 5F is a graph 520 illustrating the speed response 522 of a motor to a third test case, which multiplies an output of a process located up to a PI controller by −1 to represent a transient fault comprising a sign bit flip.

As shown in graph 520, at time of 0.5 seconds a transient fault is injected at the output signal of a process after the PI controller of an FOC feedback control loop. The transient fault causes rotational velocity of the motor to be reduced by approximately 18-20 RPM. The reduction in the rotational velocity is recovered in approximately 10 ms to approximately 15 ms. Such a small reduction in the rotation velocity will not be detrimental to operation of the motor. Accordingly, graph 520 shows that in response to the third test case diverse execution of processes located downstream of the PI controller does not have to be performed in the FOC feedback control loop.

Figure 5G:
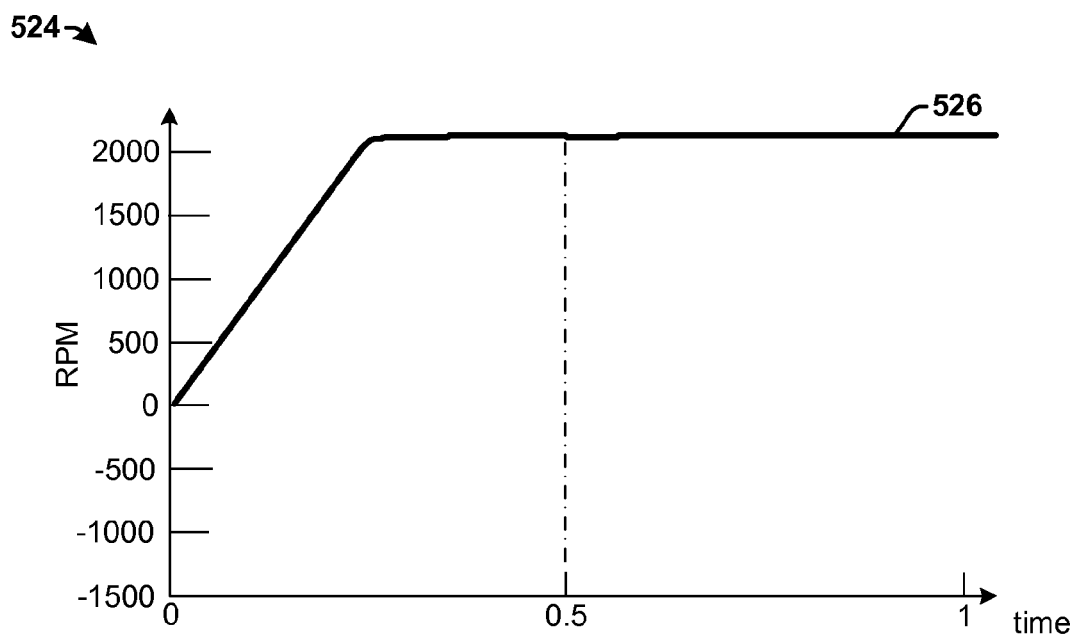

FIG. 5G is a graph 524 illustrating the speed response 526 of a motor to the third test case, which multiplies an output of a process located downstream of a PI controller by −1 to represent a transient fault comprising a sign bit flip.

As shown in graph 524, at time of 0.5 seconds a transient fault is injected at the output signal of a process after the PI controller of an FOC feedback control loop. The transient fault causes a rotational velocity of the motor to be reduced by approximately 10 RPM. The reduction in the rotational velocity is recovered in approximately 15 ms. Such a small reduction in the rotation velocity will not be detrimental to operation of the motor. Accordingly, graph 524 shows that in response to the third test case diverse execution of processes located downstream of the PI controller does not have to be performed in the FOC feedback control loop.

Therefore, FIGS. 5A-5G show that for a FOC algorithm/process, the test cases may potentially introduce a harmful transient fault into an output of a process located up to a PI controller, but not into a process located downstream of a PI controller. Therefore, for the FOC algorithm/process, diverse execution may be performed on processes located up to a PI controller and not performed on processes located downstream of a PI controller.

Figure 6:
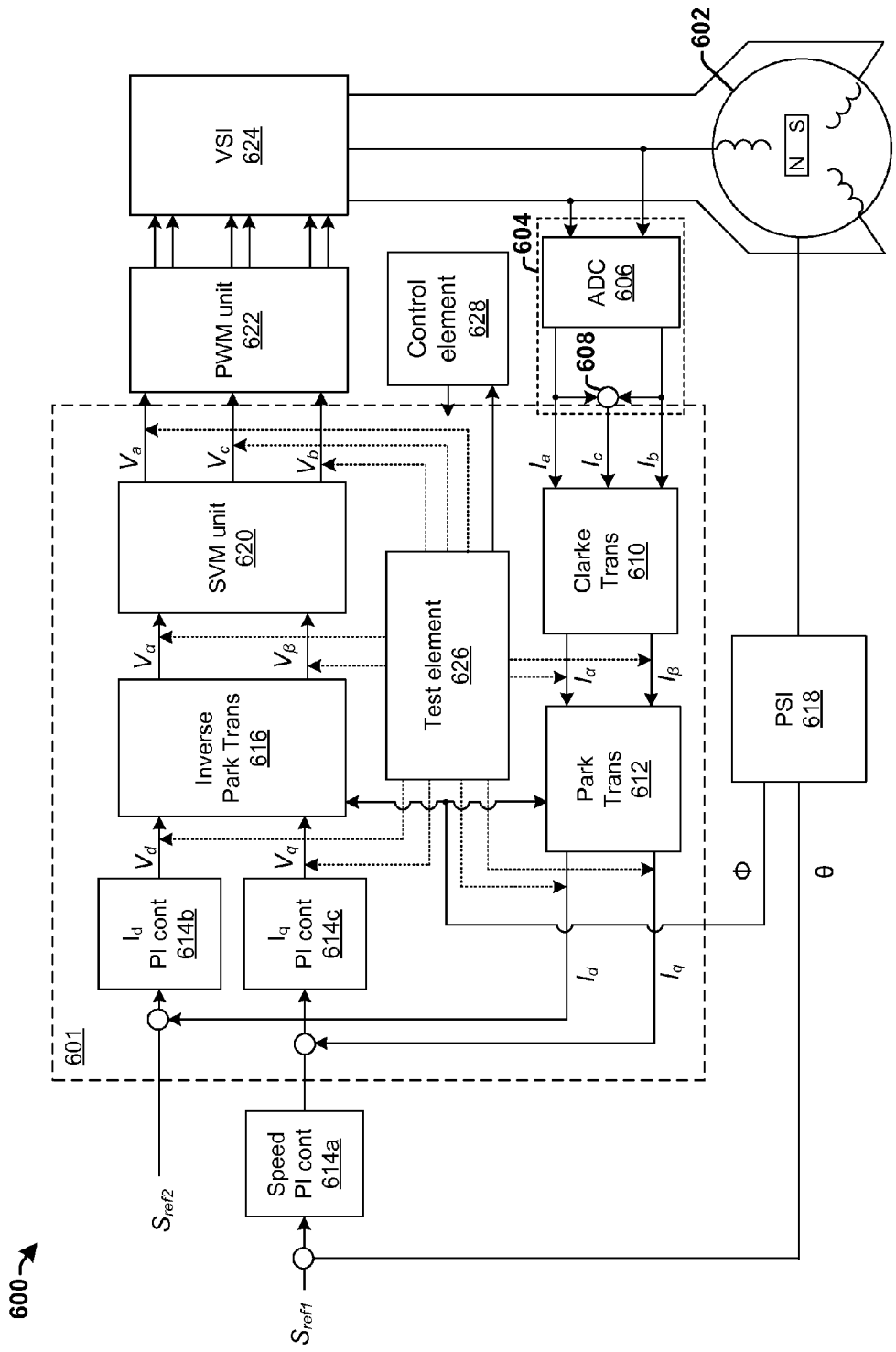
FIG. 6 is a block diagram of some more detailed embodiments of an advanced motor control system having a feedback control loop configured to implement a FOC process.

FIG. 6 is a block diagram of some more detailed embodiments of an advanced motor control system 600 having a FOC feedback control loop 601 configured to implement a FOC process.

The advanced motor control system 600 comprises a FOC feedback control loop 601 connected to a motor 602. In some embodiments, the motor 602 may comprise a three-phase brushless DC motor. In such embodiments, the motor 602 comprises three connecting wires configured to provide three input currents to the motor, wherein the current input to any two connecting wires is output through the third connecting wire (i.e., $I_a+I_b+I_c=0$). The connecting wires are configured to cause three stator coils to generate a magnetic field of a stator (a non-rotating outer portion of the motor 602), while a rotor may have a magnetic field generated by permanent magnets. The rotor and stator fields interact to generate rotational torque. The FOC feedback control loop 601 is configured to synchronize the timing and relative magnitude of the current through each stator coil to keep the magnetic field aligned as the rotor rotates.

The FOC feedback control loop 601 comprises a measuring element 604. The measuring element 604 comprises an analog to digital converter (ADC) 606 configured to generate digital signals corresponding to two currents input to the motor 602. In some embodiments, the measuring element 604 may further comprise a summation node 608 configured to determine a third motor current $I_c$ from the first and second motor currents, $I_a$ and $I_b$, since the sum of the motor currents is zero (i.e., $I_a+I_b+I_c=0$)

A Clarke transformation element 610 is configured to receive the motor currents $I_a$, $I_b$, and $I_c$ and to perform a first coordinate transformation that transforms the motor currents $I_a$, $I_b$, and $I_c$ to a two-axis system. The first coordinate transformation generates the variables $I_\alpha$ and $I_\beta$ from the motor currents $I_a$, $I_b$, and $I_c$. Variables $I_\alpha$ and $I_\beta$ are time-varying quadrature current values as viewed from the perspective of the stator.

A Park transformation element 612 is configured to receive variables $I_\alpha$ and $I_\beta$, and a position input $\phi$ from a position sensor interface 618. The Park transformation element 612 is configured to perform a second coordinate transformation that rotates the two-axis coordinate system in a manner that aligns the two-axis coordinate system with another two-axis system that is rotating with the rotor flux. The second coordinate transformation generates the $I_d$ and $I_q$ variables, wherein $I_d$ and $I_q$ are the quadrature currents transformed to the rotating coordinate system.

PI controllers 614a-614c are used to adjust performance parameters (e.g., torque, speed, etc.) of the motor 102. For example, a first PI controller 614a is configured to control speed, a second PI controller 614b is configured to control rotor flux, and a third PI controller 614c is configured to control rotor torque.

The first PI controller 614a is configured to generate a first error signal from a first reference signal $S_{ref1}$ and a new transformation angle θ, determined by the position sensor interface 618 to guide the FOC algorithm as to where to place the next voltage vector. The first error signal is provided as a reference value to the third PI controller 614c, which also receives $I_q$. The second PI controller 614b is configured to generate an error signal from a second reference signal $S_{ref2}$ and $I_d$. In the case of a BLDC motor the second reference signal $S_{ref2}$ is zero.

The outputs of the PI controllers, $V_d$ and $V_q$, which represent the reference voltages in the rotor co-ordinates, are provided to an inverse Park transformation element 616. The inverse Park transformation element 616 is configured to transform $V_d$ and $V_q$ into the stator coordinates (the stationary reference frame), using an inverse Park transformation in order to generate $V_\alpha$ and $V_\beta$.

A space vector modulation unit 620 is configured to transform the $V_\alpha$ and $V_\beta$ values back to 3-phase values $V_a$, $V_b$ and $V_c$. The three phase values $V_a$, $V_b$ and $V_c$ are provided to a PWM unit 622 configured to calculate 3-phase voltage values used to generate a new PWM duty cycle by modulating the high side and low side switches of a voltage source inverter 624.

A test element 626 is configured to introduce a plurality of test sets into outputs of different processing elements of the FOC feedback control loop 601 and to measure a speed response of the motor 602 in response to different test sets. The test element 626 is configured to provide test results to a control element 628. Based upon the test results, the control element 628 will selectively operate one or more element of the FOC feedback control loop 601 during different iterations. In some embodiments, the control element 628 is configured to perform diverse execution of the Clarke transformation element 610, the Park transformation element 612, and the one or more PI controllers 614a-614c, and not to perform diverse execution of the inverse Park transformation element 616 and the SVM unit 620.

It will be appreciated that equivalent alterations and/or modifications may occur to those skilled in the art based upon a reading and/or understanding of the specification and annexed drawings. The disclosure herein includes all such modifications and alterations and is generally not intended to be limited thereby. For example, although the disclosed system is illustrated as having two offset correction circuits and two feedback loops, one of ordinary skill in the art will appreciate that a disclosed system may comprise more than two offset correction circuits and/or feedback loops.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions

What is claimed is:

1. A method of advanced motor control, comprising:
   performing a plurality of processes within a feedback control loop of a motor control process configured to control operation of a motor;
   determining a first portion of the plurality of processes that are susceptible to transient faults and a second portion of the plurality of processes that are not susceptible to transient faults;
   repeating performance of the first portion of the plurality of processes within the feedback control loop in a diverse way within a time period;
   not repeating performance of the second portion of the plurality of processes within the feedback control loop in a diverse way within the time period; and
   controlling operation of the motor based upon the performance of the plurality of processes and the repeated performance of the first portion of the plurality of processes.

2. The method of claim 1, wherein the motor comprises a three-phase brushless DC motor configured to receive three input currents.

3. The method of claim 2,
   wherein the motor control process comprises a field-oriented control (FOC) process;
   wherein the plurality of processes comprises:
      a Clarke transformation process that performs a first coordinate transformation to transform the three input currents to first output variables representing a first two-axis system;
      a Park transformation process that receives the first output variables and to perform a second coordinate transformation to transform the first output variables to second output variables representing a second two-axis system that is rotating with a rotor of the motor;
      one or more PI controllers that receives the second output variables and based thereupon to generate error signals that adjust performance parameters of the motor;
      an inverse Park transformation process that rotates the error signals to a stationary reference frame; and
      a space vector modulation (SVM) process that controls pulse width modulation of the three input currents based upon rotated error signals.

4. The method of claim 3,
   wherein the first portion of the plurality of processes comprises the Clarke transformation process, the Park transformation process, and the one or more PI controllers; and
   wherein the second portion of the plurality of processes comprises the inverse Park transformation process and the SVM process.

5. The method of claim 1, wherein the feedback control loop is executed by a single core micro-controller.

6. The method of claim 1, further comprising:
   introducing a test set into outputs generated by one or more of the plurality of processes within the feedback control loop; and
   measuring a speed response of the motor to the test set.

7. The method of claim 6, wherein the test set is configured to introduce an error corresponding to a transient fault into the feedback control loop.

8. The method of claim 7, further comprising:
comparing the speed response of the motor to one or more threshold values to determine which of the plurality of processes are susceptible to the transient fault, and which the plurality of processes are not susceptible to the transient fault.

9. The method of claim 1,
wherein the first portion of the plurality of processes comprises:
one or more upstream processes configured to receive data from the motor;
one or more controllers configured to receive one or more first outputs from the one or more upstream processes; and
wherein the second portion of the plurality of processes comprises one or more downstream processes configured to receive one or more second outputs from the one or more controllers.

10. A method of determining advanced motor control processes susceptible to errors, comprising:
introducing one or more test sets into outputs of one or more of a plurality of processes within a feedback control loop of a motor control process configured to control operation of a motor, wherein the one or more test sets are configured to introduce errors into the outputs;
measuring a response of the motor to the one or more test sets; and
comparing the response of the motor to one or more threshold values to determine which of the plurality of processes are susceptible to the errors, and which of the plurality of processes are not susceptible to the errors.

11. The method of claim 10, further comprising:
performing the plurality of processes during a first iteration of the feedback control loop of the motor control process;
repeating performance of the plurality of processes that are susceptible to the errors in a diverse way within a consecutive, second iteration of the feedback control loop; and
not repeating performance of the plurality of processes that are not susceptible to the errors during the second iteration of the feedback control loop.

12. The method of claim 11,
wherein the motor control process comprises a field-oriented control (FOC) process;
wherein the plurality of processes comprises:
a Clarke transformation process that performs a first coordinate transformation to transform three input currents of the motor to first output variables representing a first two-axis system;
a Park transformation process that receives the first output variables and to perform a second coordinate transformation to transform the first output variables to second output variables representing a second two-axis system that is rotating with a rotor of the motor;
one or more PI controllers that receives the second output variables and based thereupon to generate error signals that adjust performance parameters of the motor;
an inverse Park transformation process that rotates the error signals to a stationary reference frame; and
a space vector modulation (SVM) process that controls pulse width modulation of the three input currents based upon rotated error signals.

13. The method of claim 12,
wherein the plurality of processes that are susceptible to the errors comprise the Clarke transformation process, the Park transformation process, and the one or more PI controllers; and
wherein the plurality of processes that are not susceptible to the errors comprise the inverse Park transformation process and the SVM process.

14. The method of claim 10, wherein the one or more test sets are configured to introduce errors corresponding to transient faults into the feedback control loop.

15. The method of claim 10, further comprising:
comparing a speed response of the motor to one or more threshold values to determine which of the plurality of processes to transient faults, and which of the plurality of processes are not susceptible to transient faults.

16. An advanced motor control system, comprising:
a motor;
a feedback control loop connected to the motor and comprising a plurality of processing elements configured to execute a motor control algorithm to control operation of the motor; and
a control element configured to determine a first portion of the plurality of processing elements that are susceptible to transient faults and a second portion of the plurality of processing elements that are not susceptible to transient faults, and to selectively repeat operation of the first portion of the plurality of processing elements in a diverse way within a time period without repeating operation of the second portion of the plurality of processing elements within the time period.

17. The advanced motor control system of claim 16, further comprising:
a test element configured to introduce a plurality of test sets into outputs of the plurality of processing elements and to measure a response of the motor to the plurality of test sets.

18. The advanced motor control system of claim 16, wherein the control element is configured to:
operate the plurality of processing elements during a first iteration of the feedback control loop of the motor control algorithm;
operate the first portion of the plurality of processing elements within a second iteration of the feedback control loop, wherein the first portion of the plurality of processing elements is less than the plurality of processing elements; and
not operate the second portion of the plurality of processing elements during the second iteration of the feedback control loop.

19. The advanced motor control system of claim 18,
wherein the motor control algorithm comprises a field-oriented control (FOC) process;
wherein the plurality of processing elements comprise:
a Clarke transformation element configured to perform a first coordinate transformation to transform three input currents of the motor to first output variables representing a first two-axis system;
a Park transformation element configured to receive the first output variables and to perform a second coordinate transformation to transform the first output variables to second output variables representing a second two-axis system that is rotating with a rotor of the motor;

one or more PI controllers configured to receive the second output variables and based thereupon to generate error signals that adjust performance parameters of the motor;

an inverse Park transformation element configured to rotate the error signals to a stationary reference frame; and a space vector modulation (SVM) unit configured to control pulse width modulation of the three input currents based upon rotated error signals.

20. The advanced motor control system of claim 19, wherein the first portion of the plurality of processing elements comprises the Clarke transformation element, the Park transformation element, and the one or more PI controllers; and wherein the second portion of the plurality of processing elements comprises the inverse Park transformation element and the SVM unit.

\* \* \* \* \*